Oct. 13, 1953  R. B. J. HULTBERG  2,655,241
DRIVING ARRANGEMENT AND CONTROL FOR CLOTHES-WASHING
APPARATUS AND THE LIKE
Filed July 16, 1947  4 Sheets-Sheet 1
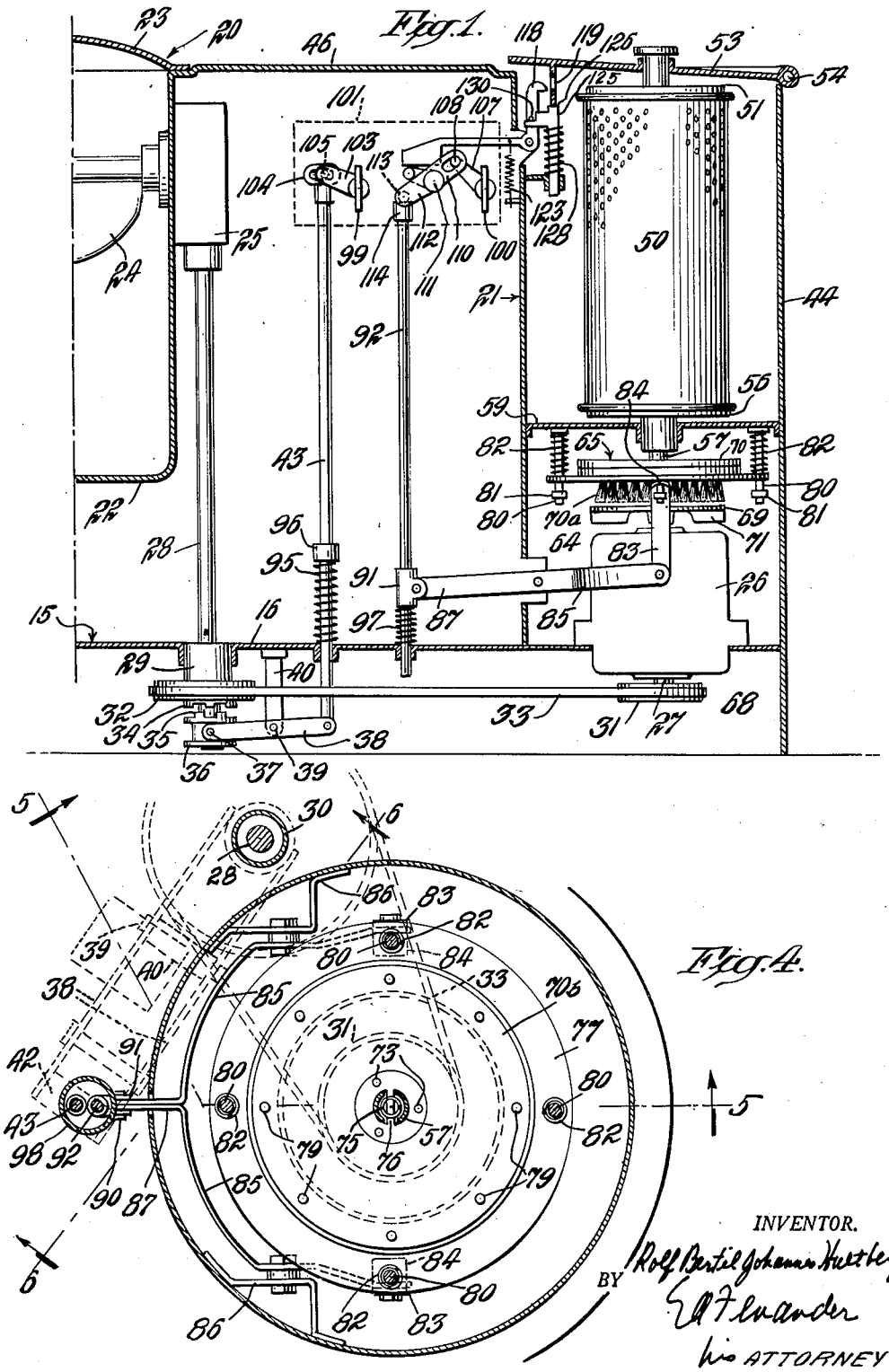

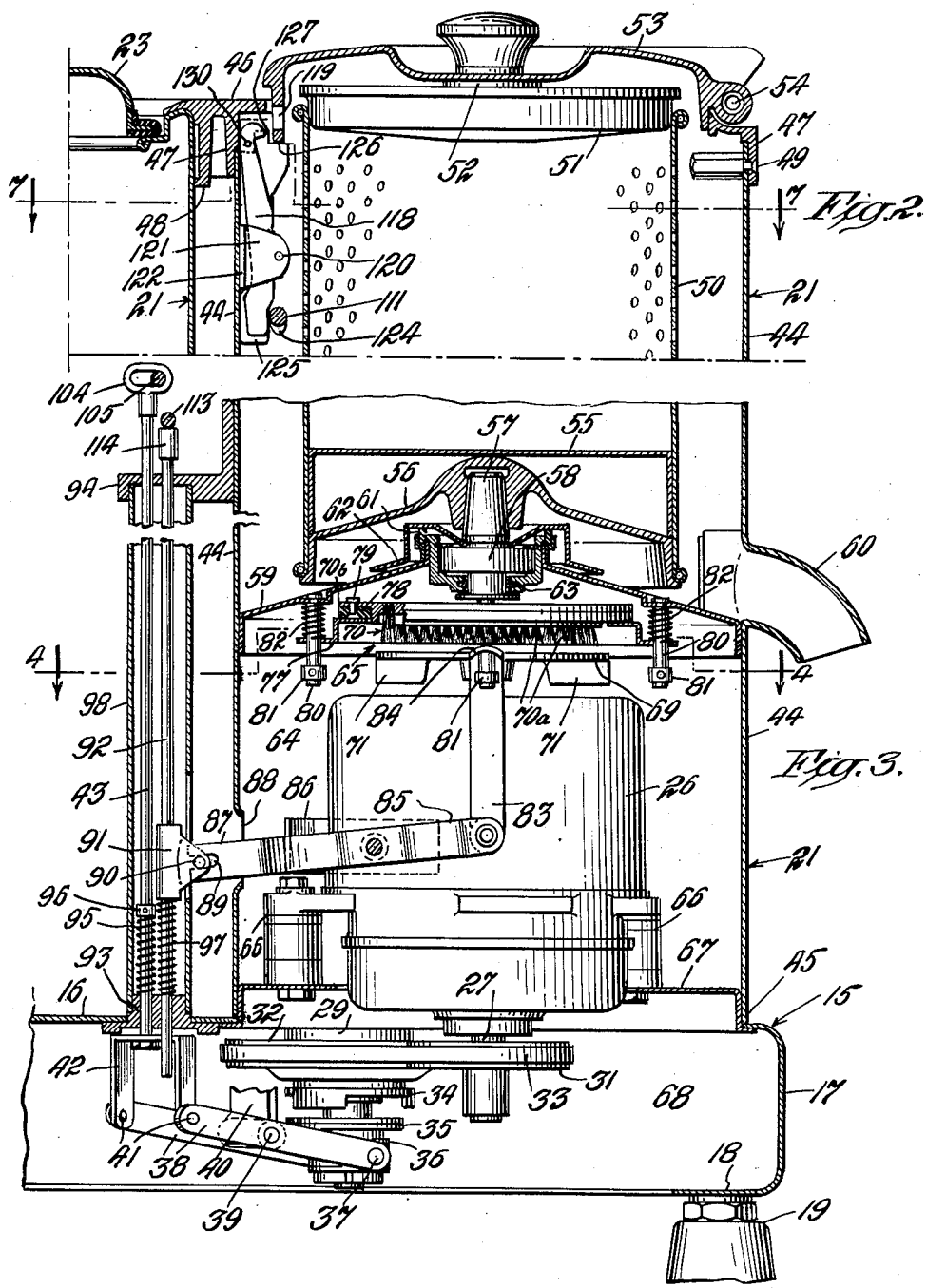

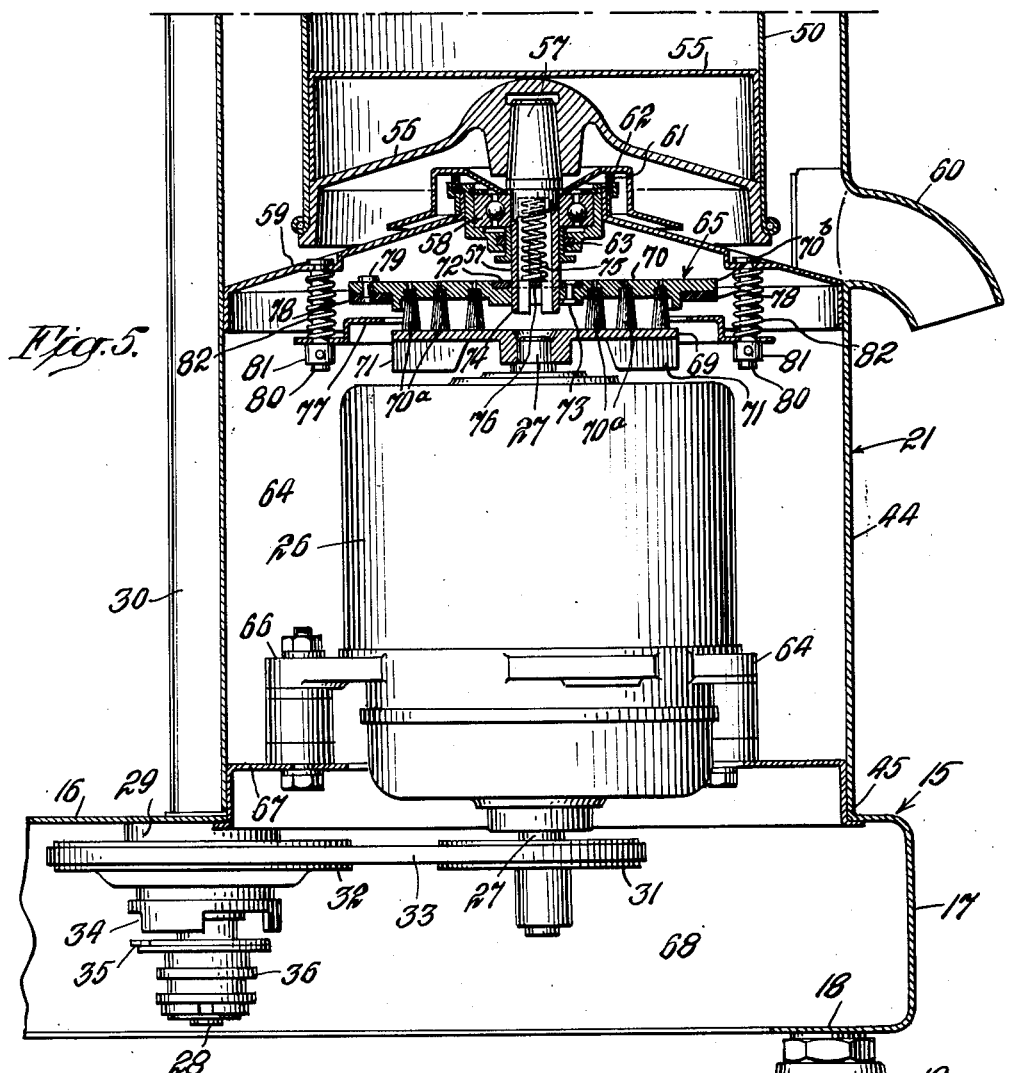

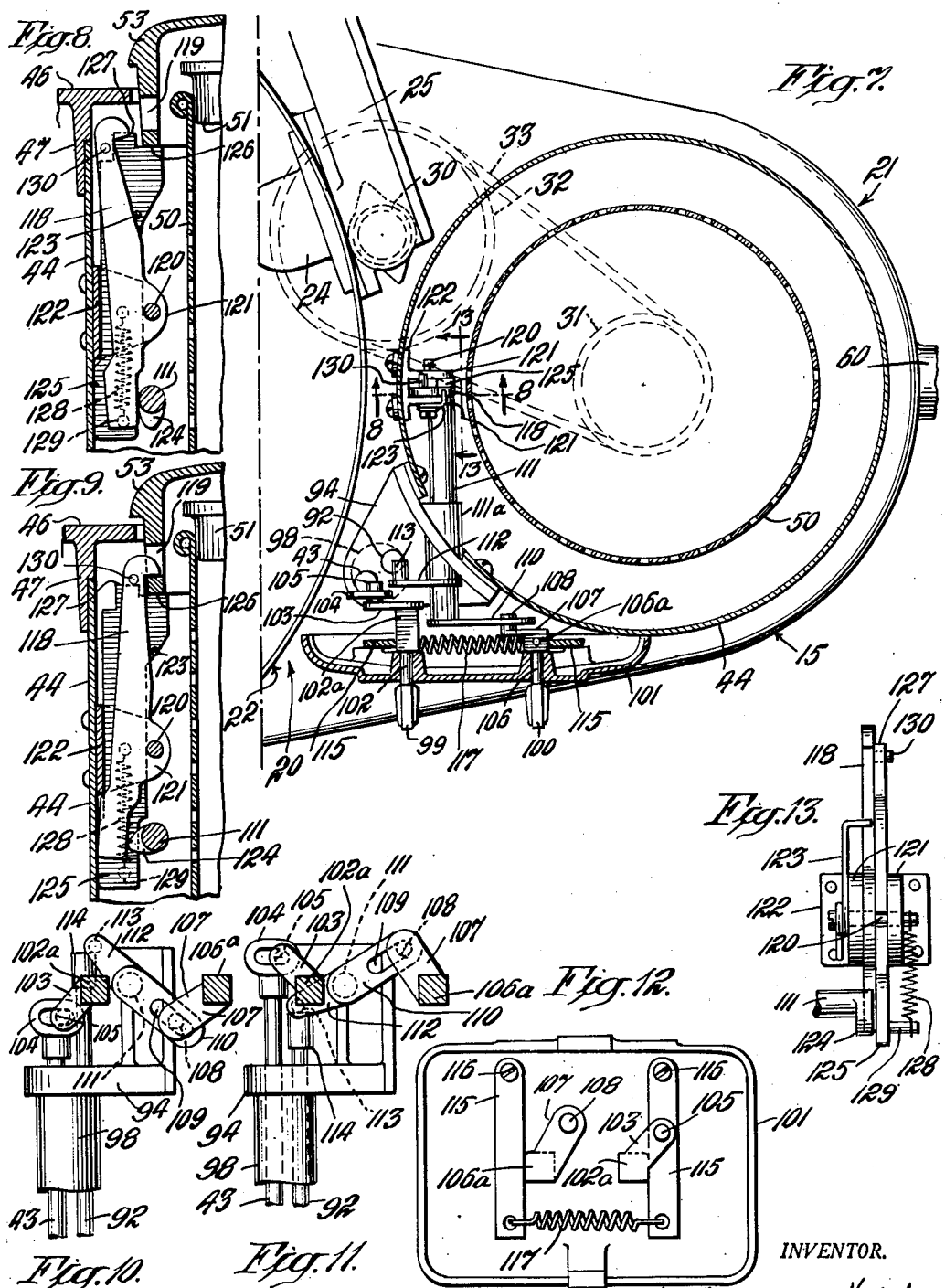

Patented Oct. 13, 1953

2,655,241

UNITED STATES PATENT OFFICE 2,655,241

DRIVING ARRANGEMENT AND CONTROL FOR CLOTHES-WASHING APPARATUS AND THE LIKE

Rolf Bertil Johannes Hultberg, Stockholm, Sweden, assignor to Aktiebolaget Elektrolux, Stockholm, Sweden, a corporation of Sweden Application July 16, 1947, Serial No. 761,300
In Sweden August 12, 1946

6 Claims. (Cl. 192—136)

My invention relates to household apparatus like apparatus for washing clothes, for example, and is especially concerned with apparatus of this type in which movement is transmitted to a rotatable part thereof from a driving member with the aid of a clutch. More particularly, my invention relates to household apparatus having a rotatable part to which movement is transmitted by a clutch with which is combined a brake adapted to arrest movement of the rotatable part when the clutch is rendered inoperable and the elements thereof are disengaged. Further, my invention is concerned with a friction clutch for household apparatus which is especially suitable for transmitting movement to a rotatable drum adapted to hold laundry from which liquid is centrifugally extracted.

My invention in one phase is concerned with a combined clutch and brake unit of simplified construction for effectively transmitting movement to a rotatable part of household apparatus, such as a drum for holding laundry, for example, when the clutch elements are engaged and for automatically applying a braking action to the rotatable part when the clutch elements are disengaged. In accordance with my invention, I accomplish this by providing a combined clutch and brake unit which is constructed in such manner that the clutch elements may be disengaged without the necessity of imparting an axial movement to the rotatable part, such as a laundry drum, for example, with which one of the clutch elements is associated.

More specifically, I provide a clutch and brake each having a pair of cooperating elements, and a part or member which is axially movable with respect to the laundry drum or other driven member and with which one of the clutch elements and one of the brake elements are associated as a unit. Such member is resiliently biased toward the other clutch element to bring the clutch elements into engagement, and suitable mechanism is provided which is arranged to separate the clutch elements when desired. The other brake element is out of engagement with the axially movable member when the clutch elements are engaged, and moves to bring the brake elements into engagement and arrest movement of the rotatable apparatus part automatically when the mechanism is actuated to disengage the clutch elements.

A manually operable control member is associated with the operating mechanism for controlling the clutch and brake. Further, protective mechanism is provided whereby movement of the control member to cause engagement of the clutch elements is prevented so long as a cover or lid, at an access opening of a casing for housing the laundry drum or rotatable apparatus part, is not in its closed position. Such protective mechanism includes a latch bolt which is arranged to lock the cover closed, and a locking member which exercises influence over the bolt and also the manually operable control member in that the cover must be in its closed position before the latch bolt may be released to lock the cover, and only thereafter can the control member be moved to actuate the operating mechanism to render the clutch operable to drive the laundry drum.

In another phase of the invention I provide a clutch having cooperating elements which, when brought into engagement, can freely assume different lateral and angular positions with respect to each other. More specifically, the clutch includes a brush element having bristles and a cooperating element having a surface adapted to be frictionally engaged by the bristles. The engaging surface desirably possesses such physical characteristics that movement is transmitted from one element to the other by the frictional contact of the bristles on such surface while permitting a sliding movement of the bristles.

A sliding friction clutch of this type lends itself to driving a drum adapted to hold laundry from which liquid is centrifugally extracted. In such case, the drum may shift sidewise and also tilt slightly under different operating conditions encountered. The brush element and engaging surface of the cooperating element readily adjust themselves to different operating conditions, especially when the bristles are resiliently held in frictional engagement with the engaging surface, whereby movement is effectively transmitted from one element to the other, while the transmission of vibration stresses and oblique torque from the drum to the driving member, as the shaft of an electric motor, for example, is minimized without injuring the clutch elements.

The invention, together with the objects and advantages thereof, will become apparent as the following description proceeds, and the features of novelty which characterize my invention will be pointed out with particularity in the claims annexed to and forming a part of this specification.

In the drawings, Fig. 1 is a vertical view more or less diagrammatically illustrating a clothes washing and liquid extracting apparatus embodying the invention;

Fig. 2 is a fragmentary vertical sectional view of the upper part of a practical form of liquid extracting apparatus like that diagrammatically shown in Fig. 1;

Fig. 3 is a fragmentary vertical sectional view of the lower part of the liquid extracting apparatus illustrated in Fig. 2 and like that diagrammatically shown in Fig. 1;

Fig. 4 is a horizontal sectional view taken at line 4—4 of Fig. 3;

Fig. 5 is a vertical sectional view, taken at line 5—5 of Fig. 4, of the lower part of the liquid extracting apparatus to illustrate details more clearly;

Fig. 6 is a fragmentary vertical sectional view taken at line 6—6 of Fig. 4;

Fig. 7 is a horizontal sectional view taken at line 7—7 of Fig. 2;

Figs. 8 and 9 are fragmentary enlarged vertical sectional views taken at line 8—8 of Fig. 7;

Figs. 10 and 11 are enlarged fragmentary views taken at line 10—10 of Fig. 7 to illustrate more clearly the different positions certain parts assume;

Fig. 12 is a fragmentary enlarged view in elevation of the rear of the control panel shown in Fig. 7; and Fig. 13 is an enlarged fragmentary sectional view taken at line 13—13 of Fig. 7.

In the drawings, I have shown my invention embodied in a combined clothes washing and liquid extracting apparatus of which a practical form is illustrated in Figs. 2 to 13 inclusive. Since none of these figures illustrate the apparatus in its entirety, such a view is more or less diagrammatically shown in Fig. 1, and in the following description similar parts in Fig. 1 and Figs. 2 to 13 inclusive are referred to by the same reference numerals to facilitate an understanding of the invention.

The apparatus comprises a base 15 which is suitably formed of sheet metal and includes a top plate 16 and a vertical side wall 17 having an inwardly extending reinforcing flange 18, as shown most clearly in Figs. 3 and 5. The base 15 is provided with three or more supporting legs 19 for supporting the apparatus in a slightly elevated position on a supporting surface.

A washing unit 20 and liquid extracting unit 21 are mounted on the base 15 alongside of each other. As shown in Fig. 1, the washing unit 20 comprises a washing receptacle 22 which may be of cylindrical form and provided with a removable cover 23 to prevent spilling of washing liquid. An agitator or washing element 24 of any suitable type is mounted for oscillation in the receptacle 22 about a horizontally extending axis. The washing element 24 is arranged to be driven by suitable mechanism 25 which is mounted on the outside of the receptacle 22 and operatively associated with an electric motor 26 having a shaft 27.

As best shown in Fig. 1, the mechanism operatively connecting the washing element 24 and the motor 26 includes a shaft 28 which extends vertically downward from the mechanism 25 in the gap between the washing unit 20 and liquid extracting unit 21, and is journalled at its lower end within a sleeve member 29 at the underside of the top plate 16 of the base 15. The shaft 28 is adapted to be driven continuously in one direction, and the mechanism 25 connected thereto may be of any conventional type which is operable to convert such continuous turning movement of the shaft 28 into an oscillatory movement for moving the washing element 24 back and forth in the receptacle 22. In order to protect the shaft 28 from washing liquid, the latter may be housed in a hollow tube 30, as best shown in Figs. 4 and 6, which is adapted to be connected at its upper end to the housing of the mechanism 25 and at its lower end to the top plate 16.

The motor 26 is operatively connected to the shaft 28 by mechanism including a grooved pulley 31 which is fixed to the lower end of the motor shaft 27, and another grooved pulley 32 which is freely rotatable on the sleeve member 29. The pulley 32, which is driven by a belt 33 from the pulley 31, is provided with an integrally formed clutch element 34 which cooperates with another clutch element 35 fixed to a collar 36. The clutch element 35 and collar 36 are keyed to the lower end of the vertical shaft 28 and only axially movable thereon.

The collar 36 at diametrically opposite sides receives inwardly extending pins 37 provided at the ends of a pair of spaced apart and parallel levers 38 which are pivoted intermediate their ends at 39 to a bracket 40 fixed to the underside of the base 15, as best shown in Figs. 1, 3 and 6. The opposite ends of the levers 38 are pivotally connected at 41 to the lower ends of an inverted U-shaped member 42 which is arranged to be moved up and down by a control rod 43, as will be described more fully hereinafter.

When the ends of the levers 38 associated with the collar 36 are moved upwardly by the control rod 43, the clutch element 35 engages the clutch element 34 whereby the motor shaft 27 operatively drives the shaft 28 through the belt 33 and the clutch elements. When shaft 28 is being driven, the mechanism 25 is rendered operative to actuate and move the washing element 24. Conversely, when the ends of the levers 38 associated with the collar 36 are moved downwardly, the clutch element 35 is disengaged from the clutch element 34, whereby the motor 26 is rendered ineffective to actuate the washing element 24.

The liquid extracting unit 21 comprises an outer shell or casing 44 of cylindrical form having its lower end removably mounted in any suitable manner at 45 at an opening formed in the top plate 16 of the base 15, as best shown in Figs. 3 and 5. The upper ends of the casing 44 and washing receptacle 22 are at substantially the same level, and the gap therebetween is bridged by a table plate 46 which also overlies the casing 44 and is provided with an opening through which the access is had into the casing.

As best shown in Fig. 2, the table plate 46 is formed with a downwardly extending sleeve portion 47 which is received by the upper end of the casing 44, and also a leg 48 of such shape that it bears snugly against the outer surface of the washing receptacle 22. The table plate 46 is removably secured in any suitable manner, as by countersunk cap screws 49, for example, to the upper end of the casing 44.

Within the upper part of the casing 44 is disposed a perforated drum 50 of cylindrical shape which is adapted to be rotated for extracting liquid centrifugally from clothes. The upper open end of the drum 50 receives a freely rotatable disc 51 journalled at 52 at the underside of a cover 53 which is hinged at 54 to the table plate 46 and adapted to be locked in its closed position during liquid extracting period, as will be described hereinafter.

When the cover 53 is locked in its closed position and the drum is being rotated, the disc 51 also rotates and serves to guide the drum 50 at its upper end. The periphery of the disc 51 desirably may be coated or provided with a layer of rubber or the like, so that it will fit snugly in the upper end of the drum 50.

As best shown in Figs. 3 and 5, an imperforate plate 55 is provided at a region within the drum 50 which is spaced from the lower imperforate end thereof and defines the bottom of the space for holding the clothes from which liquid is extracted. To the extreme lower end portion of the drum 50 is fixed a bottom end member 56 having a centrally disposed opening at the underside thereof within which is secured the upper tapered end of a vertical shaft 57.

The shaft 57 is arranged in a ball bearing 58 secured in an annular member 59 whose outer peripheral edge portion is fixed to the inside of the shell 44, as by welding, for example. The annular member 59 and the portion of the casing 44 adjacent thereto forms a trough in which liquid collects and from which the extracted liquid flows by gravity into a suitable collecting vessel (not shown) through a discharge spout 60, as seen in Fig. 5.

In order to protect the bearing 58 from washing liquid, the inner portion of the annular member 59 is formed to receive and hold packing material 61 which is in the shape of a ring and at its upper edge bears against the underside of a protecting plate or skirt 62 of the shape shown in Fig. 5. The plate 62 is held in spaced relation to the annular member 59 in any suitable manner and serves to hold back liquid tending to flow into the gap between these parts. Suitable packing material 63 is also provided at the underside of the bearing 58 to prevent liquid coming in contact therewith and also to retain lubricant in the bearing.

The annular member 59 subdivides the casing 44 into an upper compartment in which the drum 50 is disposed and a lower compartment 64 utilized to house the electric motor 26 which, in addition to actuating the washing element 24, is also arranged to drive the drum 50 through a friction clutch 65, to be described presently. The motor 26 is removably mounted at 66 to an inwardly extending flange of a collar or ring 67. Several mounts 66 are provided which are distributed about the ring 67 and preferably resilient in character to dampen vibrations of the motor and minimize the transfer of such vibrations to other parts of the apparatus.

The motor shaft 27, which is in alignment with the shaft 57, projects downwardly at its lower end into the space 68 at the underside of the base 15, as shown in Figs. 3 and 5. The grooved pulley 31 is fixed to such lower projecting end of the shaft 27 and readily accessible at the bottom opening of the base 15.

In accordance with this invention, the drum 50 is driven from the motor 26 through the sliding friction clutch 65 comprising cooperating elements 69 and 70 adapted to be moved into and out of engagement with one another. The lower element 69 is in the form of a flat disc having a central opening which receives the upper end of the motor shaft 27, as best seen in Fig. 5. The disc 69 is rigidly fixed to the shaft 27 and at its underside is formed with a number of blades or fins 71 to cause air to circulate past the motor 26 and promote air cooling thereof.

The upper element 70 of the friction clutch 65 comprises a brush including a base and bristles 70a fixed to the underside thereof. The base of the upper element 70 is formed with a centrally disposed opening and is recessed at its top face to receive a washer 72 which is secured to the base, as indicated at 73 in Fig. 5. The washer 72 is formed with two apertures closely adjacent to one another which receive a pair of downwardly extending prongs 74 formed at the lower hollow part of shaft 57.

The apertures in the washer 72 and the prongs 74 are of such shape that these parts are interlocked, whereby turning movement imparted to the element 70 will cause shaft 57 to rotate while permitting such element to move axially up and down on the prongs. Within the hollow lower part of the shaft 57 is disposed a helical coil spring 75 having its lower end acting against a bridge or connecting part 76 of washer 72 between the two apertures therein. The spring 75 possesses such physical characteristics that the element 70 is constantly being urged toward the lower element or disc 69, that is, the element 70 is biased to move into engagement with the disc 69 by the tension of the spring 75.

In order to move the elements 69 and 70 out of engagement, the upper element 70 is formed with an outer rim or ledge 70b. The rim or ledge 70b is in the path of movement of an annular member or ring 77 which is disposed about the sliding friction clutch 65 and movable from the position shown in Fig. 5 to that shown in Fig. 3, in a manner to be described presently. In Fig. 5 the bristles 70a are in frictional contact with the element 69, while in Fig. 3 the ring 77 is acting on the ledge 70b of the upper element 70 against the tension of spring 75, thereby holding the bristles 70a out of engagement with the disc or lower element 69.

Movement is transmitted from the motor 26 to the drum 50 primarily by the frictional contact between the bristles 70a and disc or lower element 69. The top face of the disc 69 is more or less smooth so that, when the bristles 70a are brought into engagement with the disc during rotation of the latter, a sliding frictional movement therebetween takes place. While the top face of the disc 69 may be rough or irregular, that is, present a surface which is granular or porous in character and having a high coefficient of friction, for example, such surface irregularities should not be such that the sliding characteristic of the clutch is lost.

By providing a sliding friction clutch like that just described, the motor 26 may be operated at its normal full speed, and, due to the sliding frictional engagement of the bristles 70a on the disc 69 when these parts are brought together, the drum 50 will gradually come up to speed until it reaches the normal full speed of the motor 26.

The sliding friction clutch 65 automatically adjusts itself to varying operating conditions encountered in extracting liquid from clothes in the drum 50. Since there is always a certain amount of play of the shaft 57 in the bearing 58 in which it is journalled, the upper clutch element 70 may at times move sidewise with respect to the lower disc 69 and also tilt slightly into an oblique position, so that the clutch elements are not parallel to one another in planes transverse to the axis of rotation.

This may occur, for example, when clothes are unevenly distributed in the drum 15 while liquid is being centrifugally extracted therefrom. In such case, the resilient character of the bristles 70a permits the latter to flex the appropriate degree against different regions of the disc 69, so that turning movement of the motor shaft 27 is effectively transmitted to the shaft 57 and drum 50 fixed thereto while the transmission of vibration stresses and oblique torque from the drum to the motor 26 is substantially prevented.

In the event the drum 50 should assume a position at a slight angle relative to the axis of the motor shaft 27, the action of the bristles 70a, when the latter are in frictional engagement with the disc 69, is such that the clutch elements themselves are not likely to be injured or damaged. The friction moment of the sliding friction clutch 65 preferably is of such character that the brush or upper element 70 will slide on the disc 69 when rotation of the drum 50 is being initiated, thus enabling the drum to start rotating in a smooth and even manner.

In further accord with the invention, the outer ledge or rim 70b of the upper element is utilized as a braking surface and the ring 77 as a movable brake shoe for rapidly stopping rotation of the drum 50. This is accomplished by providing an annular brake lining 78 at the underside of the ledge 70b which may be formed of asbestos, leather and fibre or the like, for example, and secured to the ledge, as indicated at 79 in Figs. 3 and 5.

The annular plate or ring 77 is movably supported on four spaced apart pins 80 fixed at their upper ends to the annular member 59 and depending downwardly therefrom. The ring 77 is formed with openings through which the pins 80 pass, suitable collars 81 being removably secured to the lower ends of the pins to adjust and limit the lowermost position the ring assumes on the pins. A helical coil spring 82 is disposed about each pin to bias the ring 77 to its lowermost position against the nuts 81, as shown in Fig. 5.

When the ring 77 is lowered, the spring 75 within the hollow lower part of shaft 57 becomes effective to bring the sliding friction clutch elements 69 and 70 into engagement, as previously explained. When upward movement is imparted to ring 77 against the tension of the springs 82, the ring 77 engages the brake lining 78. With continued upward movement of the ring 77, the latter raises the upper clutch element 70 out of engagement with the lower element or disc 69 against the tension of the spring 75. Hence, the instant the motor 26 ceases to transmit turning movement to the drum 50 through the sliding frictional clutch 65, braking action is initiated by applying the ring 77 against the brake lining 78 to arrest movement of the drum 50.

As best shown in Figs. 3 and 4, the annular plate 77 is moved up and down by mechanism comprising a pair of straps 83 having outwardly extending arched or curved tabs 84 at the upper ends thereof which are provided with openings through which two of the pins 80 pass. The straps 83 are operatively associated with diametrically opposite pins 80 on the annular plate 77 and are disposed between the collars 81 and the underside of the annular plate. The straps 83 extend downwardly on opposite sides of the motor 26 and at the lower ends thereof are pivotally connected to the spaced apart curved arms of a yoke 85 which is disposed about and straddles the motor.

As seen in Fig. 4, the arms of the yoke 85 intermediate the ends thereof are pivotally mounted on brackets 86 fixed to the inside of the casing 44. From a region of the yoke 85 at which the arms thereof come together, a bar 87 projects through an opening 88 in the casing 44. The extreme outer end of the bar 87 outside the casing 44 is formed with a slot 89 which receives a pin 90 fixed to a plate 91 rigidly connected to a control rod 92.

It will now be understood that when the control rod 92 is moved downwardly, the yoke 85 moves in a counter-clockwise direction on the brackets 86, as seen in Fig. 3, and raises the straps 83, thereby lifting the annular plate 77 on the pins 80 and separating the clutch elements 69 and 70. Conversely, when the control rod 92 moves upwardly, the yoke moves in a clockwise direction on the brackets 86, thereby lowering the straps 83. The straps 83 are not connected directly to the annular plate 77 and only loosely associated therewith, whereby lowering of the straps permits the springs 82 to move the annular plate 77 from the position shown in Fig. 3 to that shown in Fig. 5 and bring the clutch elements 69 and 70 in sliding frictional engagement.

As shown in Figs. 3 and 6, the control rod 92 is disposed adjacent the control rod 43 which, as previously described, is operative upon up and down movement thereof to disengage and engage the clutch elements 34 and 35, respectively, to render motor 26 inoperative or operative to actuate the washing element 24. The control rods 43 and 92 are supported and guided at the lower ends thereof in passages formed in a block 93 which is fixed in an opening at the top plate 16 of the base 15, as shown in Fig. 3; and at the upper ends thereof in passages formed in a bracket 94 which is mounted on the outside of the casing 44, as shown in Figs. 3 and 7.

A helical coil spring 95 is disposed about the control rod 43, between the block 93 and a collar 96 adjustably fixed to the control rod, so that the control rod is biased upwardly; that is, spring 95 acts to move the clutch elements 34 and 35 out of engagement. Similarly, a helical coil spring 97 is disposed about the lower part of the control rod 92, between the block 93 and the hub portion of the plate 91, so that the control rod 93 is also biased upwardly with the spring 97 acting to permit the sliding clutch elements 69 and 70 to come into frictional engagement. The control rods 43 and 92 are desirably enclosed in a tube 98 having an opening in the side thereof of sufficient length to permit the desired vertical movement of the plate 91 forming a part of the mechanism for lifting and lowering the annular plate 77.

The control rods 43 and 92 are arranged to be operated by manually operable control members 99 and 100, respectively, mounted on a control panel 101 positioned adjacent the casing 44 and more or less occupying the space or gap between the casing 44 and washing receptacle 22, as shown in Fig. 7. The control panel 101 is located beneath the table top 46 and rigidly fixed in any suitable manner (not shown) to the bracket 94 at the side of the casing 44.

The control member 99 is fixed to the outer end of a shaft 102 which passes through an opening in the control panel 101 and at its inner end is provided with an arm or lever 103. As shown in Figs. 3 and 7, a slotted member 104 is fixed to the upper end of control rod 43 which receives a pin 105 secured to the outer end of the arm 103.

By manually turning control member 99 in a counterclockwise direction, as seen in Figs. 1 and 7, the control 43 is moved downwardly against the tension of spring 95 to bring clutch elements 34 and 35 into engagement and connect the washing element 24 to the motor 26. By turning the control member 99 in a clockwise direction, the control rod 43 is moved upwardly with the aid of spring 95, thereby disconnecting the washing element 24 from the motor 26.

The control member 100 for manually controlling the operation of the liquid extracting unit 21 is fixed to the outer end of a shaft 106 which also passes through an opening in the control panel 101 and at its inner end is provided with a radially extending arm 107. To the outer end of arm 107 is fixed a pin 108 which rides in an elongated slot 109 formed at the outer end of a lever 110 fixed to an end of a shaft 111.

The shaft 111 is rotatably supported in a sleeve 111a which may be formed integrally with the bracket 94 and projects within the shell 44, as shown in Fig. 7. At a region spaced from and closely adjacent to the lever 110, a second radially extending lever 112 is fixed to the shaft 111 at the outer end of which is provided a pin 113. The pin 113 is arranged to contact and bear against the upper enlarged end 114 of the control rod 92.

By manually turning control member 100 in a counterclockwise direction, as seen in Figs. 1 and 7, the lever 107 imparts a clockwise turning movement to the shaft 111 through the lever 110, thereby turning lever 112 in the same direction as the shaft and permitting spring 97 to cause upward movement of the control rod 92. Such upward movement of control rod 92, as previously explained, renders the sliding friction clutch 65 operable to connect the motor 26 to the drum 50 to drive the latter.

Conversely, by turning the control member 100 in a clockwise direction, the shaft 111 is turned in a counter-clockwise direction through the levers 107 and 110, thereby causing the pin 113 on lever 112 to move downwardly against the upper end of the control rod 92 and lower the latter to disengage the motor 26 from the drum 50.

As shown in Figs. 10, 11 and 12, the shafts 102 and 106 are formed with portions 102a and 106a, respectively, which are square in section. At the rear of the control panel 101, as seen in Fig. 12, a pair of straps 115 are pivoted at their upper ends at 116, and at their lower ends connected by a spring 117 for resiliently holding the straps against the outer sides of the square shaft portions 102a and 106a. In this way the shafts 102 and 106 assume definite positions when the control members 99 and 100 are manually turned to connect and disconnect the washing element 24 and drum 50, respectively, to and from motor 26. The spring 117 and the straps 115 act to arrest the movement of the shafts 102 and 106 when being moved from one position to another.

In order to prevent the drum 50 from being driven by the motor 26 when the cover 53 of the liquid extracting unit 21 is not moved to its closed position, protective mechanism is provided which will permit turning of the control member 100 to drive the drum 50 only when the cover 53 is locked in its closed position. This protective mechanism includes a latch or bolt 118 formed with a hook at its upper end which is arranged to cooperate with an opening 119 provided in the downwardly extending flange of the cover 53, as best shown in Figs. 1, 8 and 9.

The latch 118 is pivotally carried on a pin 120 mounted in the spaced apart arms 121 of a U-shaped bracket 122 fixed to the inside of the casing, as shown in Fig. 7. About the pin 120 is provided a torsion spring 123 having one end arranged to act against the base of the bracket 122 and the opposite hooked end arranged to act against the latch 118.

A cam 124 fixed to the shaft 111 is arranged to act against the lower part of the latch 118, as shown in Figs. 8, 9 and 13. When the control member 100 is turned to start rotation of the drum 50, the cam 124 acts on the latch 118 against the tension of spring 123 to move the latch from its open position in Fig. 8 to its locking position in Fig. 9.

Adjacent to and abutting the latch 118 is provided a locking member 125, both of these parts being positioned in the gap between the bracket arms 121. As shown in Figs. 8 and 9, it will be seen that the locking member 125 is provided with a shoulder 126 and a catch or tab 127 at its upper end, and the middle or intermediate portion thereof is of such width that it is vertically movable in the space between the base of the bracket 122 and the pin 120.

The locking member 125 is biased to its upper position in Fig. 8 by a coil spring 128 having one end thereof fixed to the pin 120 and the opposite end thereof fixed to a pin 129 secured to the lower part of the locking member, as best shown in Fig. 13. When the locking member 125 is in its upper position in Fig. 8 due to the tension of the spring 128, a pin 130 fixed to the upper end of latch 118 is held against a side of the catch or tab 127, thereby preventing the cam 124 from being turned by control member 100 when the cover 53 of the liquid extracting unit 21 is not in its closed position.

It is believed that the operation of the washing apparatus will be apparent from the above description. However, it may be desirable to give a brief description of the operation of the apparatus in order that the control provisions provided will be fully understood.

The control members 99 and 100 may be turned to effect washing and liquid extracting operations together or independently of one another. When it is desired to instigate a washing operation, the motor 26 is connected to a source of electrical supply and the washing receptacle 22 filled with washing liquid and the clothes to be washed. The motor 26 is then rendered operative to drive the washing element 24 by manually turning control member 99 in a counter-clockwise direction, as seen in Figs. 1 and 7. In doing this the lever 103 is moved from the position shown in Fig. 11 to that shown in Fig. 10, whereby control rod 43 is moved downwardly to render motor 26 operable to drive the washing element 24, as previously described. At the completion of a washing period, control member 99 is manually turned in a clockwise direction, as seen in Figs. 1 and 7, thereby disengaging the clutch elements 34 and 35 and disconnecting the motor 26 from the washing element 24.

The washed clothes, either before or after rinsing, may then be placed in the drum 50 for removing liquid centrifugally therefrom. In the act of pushing cover 53 downwardly to its closed position to start a liquid extracting operation, the lower edge of the cover acts against the shoulder 126 of the locking member 125 and moves the latter vertically downward against the tension of the spring 128 from the position shown in Fig. 8 to that in Fig. 9. In moving the locking member 125 downwardly, the catch or tab 127 thereof moves to a lower level with respect to the pin 130 which is fixed to the latch 118, the relative positions of these parts now being such that the pin 130 can pass over the top edge of the catch 127.

Therefore, when the cover 53 is shut tight and the pin 130 is clear of the catch 127, the control member 100 can be turned in a counter-clockwise direction from an "off" position to an "on" or operating position, as viewed in Figs. 1 and 7. In doing this the arm 107 and levers 110 and 112 move from the positions shown in Fig. 11 to those shown in Fig. 10, causing thereby the spring 97 to move control rod 92 upwardly and permitting the annular ring 77 to move downwardly, so that the spring 75 will be effective to bring the elements 69 and 70 of the sliding friction clutch 65 into frictional engagement.

At the instant the drum 50 is being operatively connected to the motor 26, the cover 53 is being locked in its closed position. Thus, when control member 100 is turned in a counter-clockwise direction, the shaft 111 turns in a clockwise direction, as viewed in Figs. 8 and 9, thereby causing cam 124 to act on the latch 118 to move the latter against the tension of torsion spring 123 to the position shown in Fig. 9.

In this way the hooked upper end of the latch 118 enters the opening 119 in the cover 53 and the latter cannot be opened until the control member 100 is turned to disconnect the drum 50 from the motor 26. When this is done, the straps 83 of the operating mechanism impart upward movement to the annular member 77 which not only acts against the upper element 70 to separate the latter from the lower element 69, but also acts as a brake shoe to arrest movement of the drum 50 the moment it contacts the brake lining 78. This braking effect increases in intensity as the annular ring 77 is being moved upwardly against the tension of the springs 82. Simultaneously with such increase in braking effect, the upper clutch element 70 is being moved against the tension of the spring 75 to effect separation of the sliding clutch elements 69 and 70.

When the control member 100 is turned from the "on" or operating position to the "off" position to terminate the liquid extracting operation, the shaft 111 turns to shift the cam 124 from the position shown in Fig. 9 to that in Fig. 8. This movement of the cam 124 permits the torsion spring 123 to move the latch 118 from its locking position in Fig. 9 to its open position in Fig. 8. The instant the pin 130 of latch 118 completes its movement over the top of the catch or tab 127, the spring 128 becomes effective to move the locking member 125 vertically upward.

Since the lower edge of the cover 53 rests against the shoulder 126 of the locking member 125, the upward vertical movement of the latter automatically raises the cover 53 slightly from its closed position in Fig. 9 to the position shown in Fig. 8. Hence, the locking member 125 not only exercises control over the latch 118 but also serves to ease the cover 53 upwardly at the termination of a liquid extracting operation.

In view of the foregoing, it will now be understood that an improved combined clutch and brake arrangement for washing apparatus and the like has been provided in which one clutch element 70 and one brake element 70b having a brake lining 78 are associated with one another and embodied as a unit in a single member which is axially movable with respect to the drum 50. Such single member is resiliently biased by the spring 75 toward the other clutch element 69 to maintain the clutch elements in engagement. When the clutch elements are in engagement the other movable brake element 77 is biased from the brake element 70b by the springs 82 to maintain the brake elements out of engagement.

In the arrangement provided the movable brake element or annular plate 77 serves as a component part of the operating mechanism for controlling the clutch and brake. Thus, when it is desired to disengage the clutch, and the brake element 77 is moved upwardly against the tension of the springs 82, such brake element imparts movement to the member with which clutch element 70 is associated and moves the latter upwardly against the tension of spring 75.

The straps 83, yoke 85, vertical rod 92, levers 112 and 110 connected to shaft 111, and arm 107 fixed to shaft 106 together constitute a motion transmitting means operatively associating the manually operable control member 100 and movable brake element 77. The straps or levers 83 are not connected directly to the brake element 77 and are only operatively associated with the latter to impart movement thereto in one direction. Hence, when the straps 83 move downwardly, the springs 82 automatically become effective to move the brake element 77 in the same direction and follow the upper ends 84 of the straps.

When the pin 113 at the end of lever 112 is not acting to push control rod 92 downwardly, the spring 97 becomes effective to urge the rod 92 in an upward direction. In a broader sense the spring 97 serves to bias the motion transmitting means whereby the straps or levers 83 are also biased in the same direction as the movable brake element 77 when the control member 100 is turned to disengage the brake elements.

Therefore, when the control member 100 is operated to cause the clutch elements 69 and 70 to engage, the springs 97 and 82 bias parts in such a direction that the spring 75 becomes effective to bring the clutch elements into frictional engagement without the necessity of positively transmitting force from the control member 100 through the operating mechanism to render motor 26 operable to drive the drum 50.

Although I have shown a single embodiment of my improved combined clutch and brake arrangement embodied in washing apparatus, I do not desire my invention to be limited to the particular arrangement set forth, and I intend in the claims to cover all modifications which do not depart from the spirit and scope of my invention.

What is claimed is:

1. Washing apparatus of the type described comprising a driving member, a driven member, a clutch including a pair of cooperating elements for transmitting movement of said driving member to said driven member, a brake for said driven member including a first element and a cooperating second element, a part axially movable with respect to said driven member, one of said clutch elements and said first brake element being associated with said part as a unit, first resilient means for biasing said part in one direction toward said other clutch element to engage said clutch elements, second resilient means for biasing said second brake element in said one direction from said part to disengage said brake elements, mechanism operable to move said second brake element in the opposite direction toward said part against the tension of said first and second resilient means to apply said brake and disengage said clutch, said clutch and brake being so constructed and arranged that said clutch elements are engaged and said brake elements are disengaged in one position of said part and said clutch elements are disengaged and said brake elements are engaged in another position of said part, and third resilient means for biasing said mechanism to render said first and second resilient means operable to bias said part and second brake element, respectively, in said one direction.

2. Apparatus of the type described comprising a drum adapted to hold laundry, means for supporting said drum for rotation about a vertical axis, a driving member, a clutch for transmitting movement from said driving member to said drum including a lower vertically immovable element associated with said driving member and an upper friction element cooperating therewith, a brake for said drum including a lower movable element and an upper element cooperating therewith, a movable part with which the upper elements of said clutch and brake are associated as a unit, mechanism for moving said part to and from said lower clutch element to engage and disengage said clutch elements, respectively, said mechanism being operable to move said lower brake element toward said part to engage said brake elements when said part is being moved to disengage said clutch elements and operable to effect movement of said lower brake element from said part to disengage said brake elements when said part is being moved to engage said clutch elements, and resilient means for biasing said lower movable brake element from said upper brake element to disengage said brake elements and maintain the latter in spaced apart relation, said resilient means being fully effective when said clutch elements are engaged, both of said brake elements being substantially at the same horizontal level of said upper friction element when said clutch elements are engaged and said brake elements are maintained in spaced apart relation by said resilient biasing means.

3. Apparatus of the type described comprising a drum adapted to hold laundry, means for rotatably supporting said drum, a driving member, a clutch for transmitting movement from said driving member to said drum including a pair of cooperating elements, a brake for said drum including a pair of cooperating elements, a movable part with which one of said clutch elements and one of said brake elements are associated as a unit, first resilient means to bias said part in one direction toward said other clutch element to engage said clutch elements, second resilient means to bias said other brake element in said one direction from said part to disengage said brake elements, mechanism coacting with said other brake element which includes a movable control member for moving said part to control said clutch and brake, and structure for supporting said other brake element independently of said mechanism while enabling said other brake element to move toward and from said part, said mechanism being so constructed and arranged that said first resilient means is effective to move said part in said one direction to engage said clutch elements and said second resilient means is effective to move said other brake element in said one direction from said part to disengage said brake elements in a first position of said control member while said part acts in the opposite direction against said first resilient means to disengage said clutch elements and said other brake element acts in the opposite direction against said second resilient means to engage said brake elements in a second position of said control member.

4. Apparatus of the type described comprising a drum adapted to hold laundry, means for rotatably supporting said drum, a driving member, a clutch for transmitting movement from said driving member to said drum including a pair of cooperating elements, a brake for said drum including a pair of cooperating elements, a part with which one of said clutch elements and one of said brake elements are associated as a unit, mechanism including a manually operable control member movable between an "off" position and an "on" or operating position for controlling said clutch and brake, said mechanism including a pivotal member operable to act on said clutch and brake and with which said control member coacts, said clutch and brake being so constructed and arranged that said part is in engagement with said other clutch element and disengaged from said other brake element in the "on" position of said control member and said part is in engagement with said other brake element and out of engagement with said other clutch element in the "off" position of said control member, and resilient means for biasing said pivotal member to enable said clutch elements to engage and said brake elements to disengage in the "on" position of said control member, said control member in the "off" position thereof being capable of moving said pivotal member against the tension of said resilient means to disengage said clutch elements and engage said brake elements.

5. Household apparatus of the character described comprising a rotatable part, such as a drum for holding laundry, for example, a driven shaft connected to said part, a driving shaft, a member fixed to one of said shafts and only axially movable thereon, a clutch including one element associated with said other shaft and a cooperating element carried by said member, a brake including a movable element and a cooperating element associated with said member which is in the path of movement of said movable element, mechanism operatively associated with said movable brake element and said member for controlling said clutch and brake, structure for supporting said movable brake element independently of said mechanism while enabling said movable brake element to move in its path of movement, said mechanism being so constructed and arranged that said clutch elements are engaged and said brake elements are disengaged in one position of said member and said clutch elements are disengaged and said brake elements are engaged in another position of said member, said mechanism including first resilient means carried by said one shaft for biasing said clutch elements into engagement and said structure for supporting said movable brake element including second resilient means to bias said brake elements out of engagement, movement being imparted to said member against the tension of said first resilient means through said movable brake element when the latter is moved against the tension of said second resilient means by said mechanism, a manually operable control member and motion transmitting means between said control member and said movable brake element, said motion transmitting means including lever means arranged to act on said movable brake element against the tension of said second resilient means while not directly connected thereto, and a third resilient means associated with said motion transmitting means for biasing said lever means in the same direction said movable brake element is biased.

6. Apparatus as set forth in claim 5 including a casing for housing said rotatable part, said casing having an access opening, a cover pivotally hinged on said casing for closing the opening, latch means for locking said cover in its closed position in response to movement of said control member in a direction to actuate said motion transmitting means against the tension of said third resilient means, and means including a part at the immediate vicinity of said latch means arranged to be acted upon by said cover for inhibiting movement of said control member in said direction in the event said cover is not in its closed position and capable of being locked by said latch means.

ROLF BERTIL JOHANNES HULTBERG.

References Cited in the file of this patent

UNITED STATES PATENTS

| Number | Name | Date |
|---|---|---|
| 486,630 | Crook | Nov. 22, 1892 |
| 509,183 | Roper | Nov. 21, 1893 |
| 1,653,266 | Frantz | Dec. 20, 1927 |
| 1,692,804 | Bock | Nov. 27, 1928 |
| 1,770,596 | Nelson et al. | July 15, 1930 |
| 1,770,956 | Terwilliger | July 22, 1930 |
| 1,795,733 | Nelson | Mar. 10, 1931 |
| 1,836,748 | Carley | Dec. 15, 1931 |
| 1,909,793 | Adams | May 16, 1933 |
| 1,959,732 | Meyer | May 22, 1934 |
| 1,966,920 | Conterman | July 17, 1934 |
| 2,069,741 | Hougland | Feb. 9, 1937 |
| 2,111,143 | Geldhof | Mar. 15, 1938 |
| 2,264,202 | Forney | Nov. 25, 1941 |
| 2,291,088 | Morgenstern | July 28, 1942 |
| 2,346,668 | Dunham | Apr. 18, 1944 |
| 2,386,165 | Lundberg | Oct. 2, 1945 |
| 2,432,272 | Bariffi | Dec. 9, 1947 |

FOREIGN PATENTS

| Number | Country | Date |
|---|---|---|
| 11,337 | Great Britain | Dec. 20, 1927 |
| 396,004 | Germany | May 22, 1924 |
| 631,828 | Germany | June 27, 1936 |